United States Patent Office 3,553,763
Patented Jan. 12, 1971

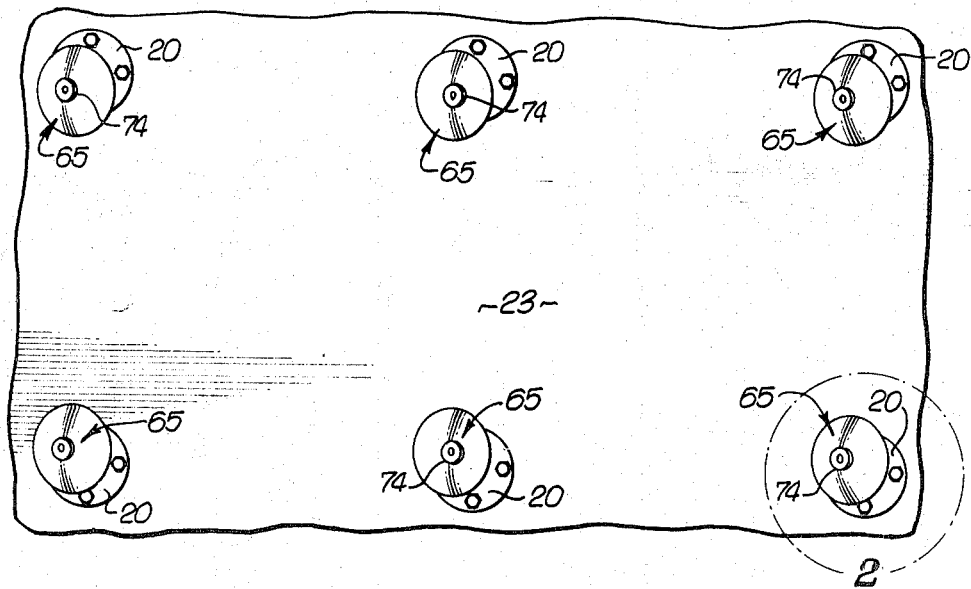
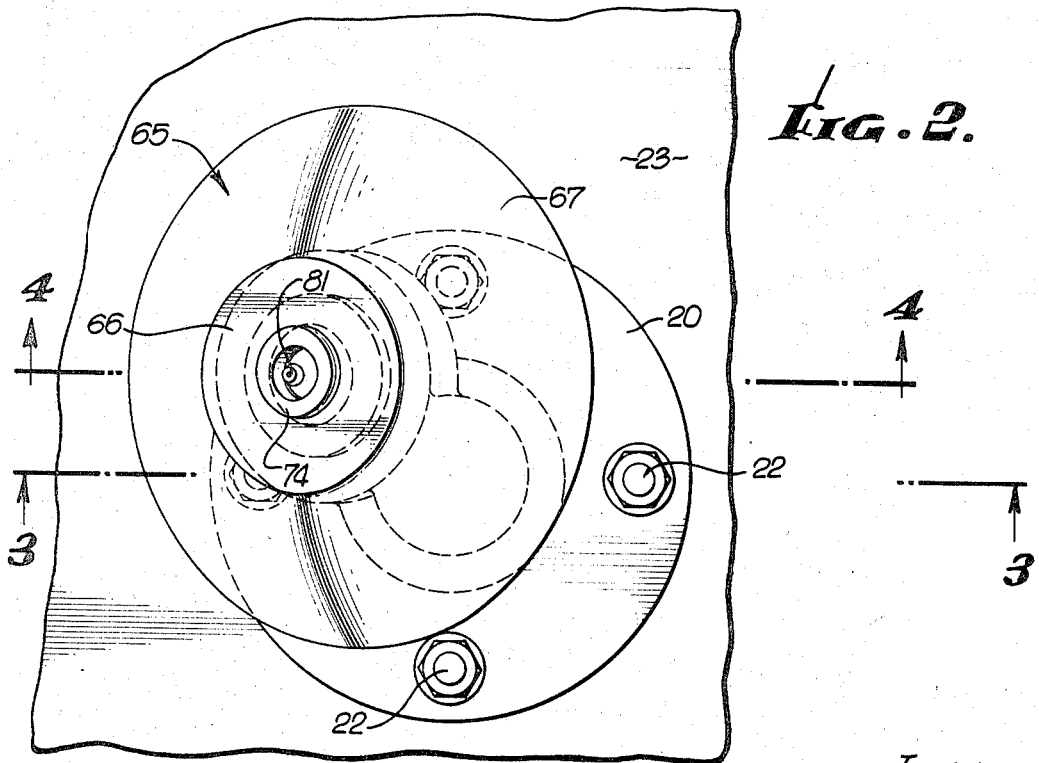

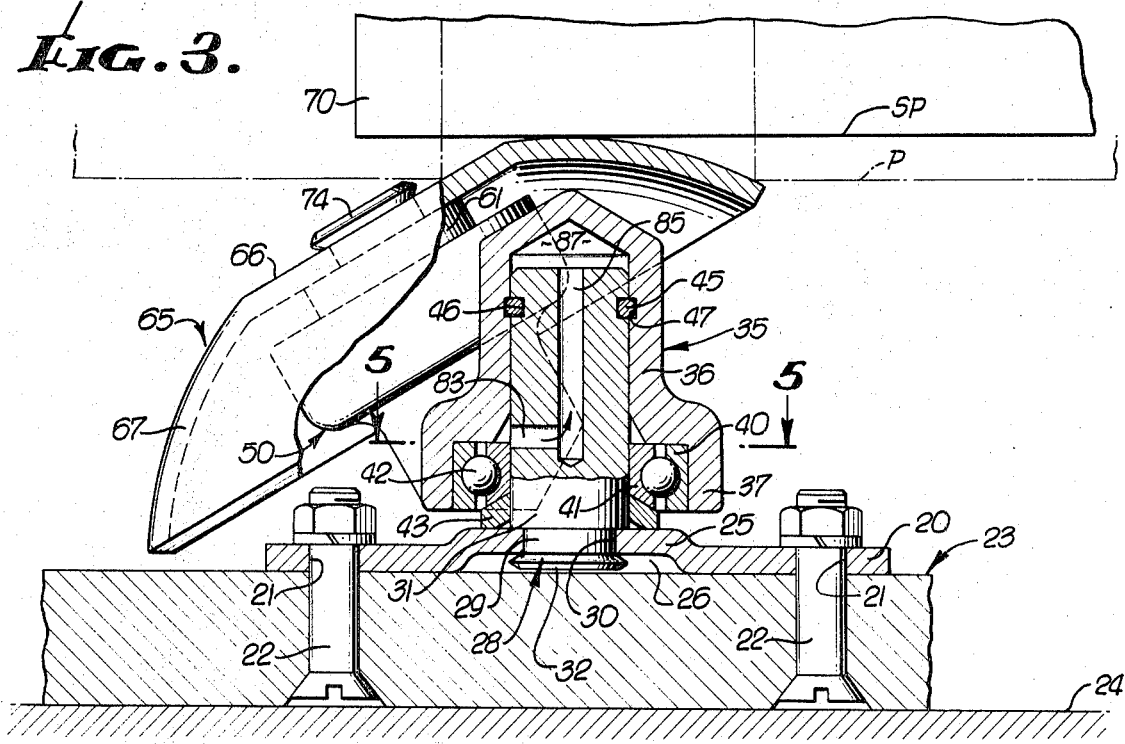
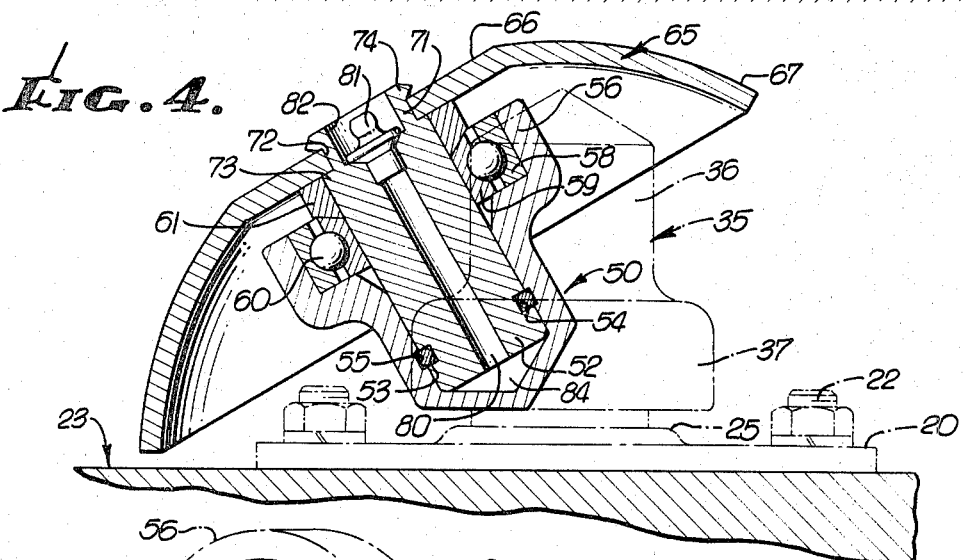
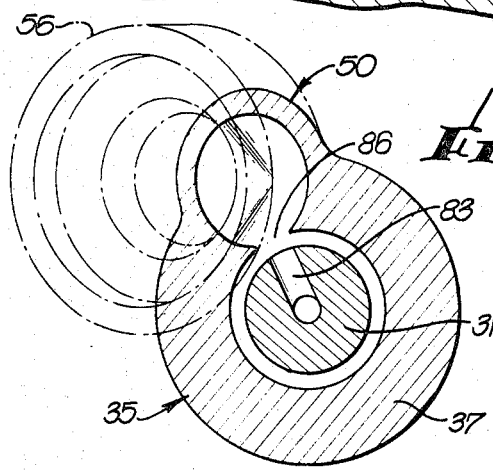

3,553,763
CASTER AND PLATFORM ASSEMBLY
Glynn H. Williams, Huntington Park, Calif., assignor to Western Gear Corporation, Lynwood, Calif., a corporation of Washington
Filed Sept. 26, 1968, Ser. No. 762,902
Int. Cl. B60b 33/00
U.S. Cl. 16—43                                    3 Claims

ABSTRACT OF THE DISCLOSURE

A caster especially adapted to heavy duty and to use in standard or inverted installation and embodying a relatively deep segment of a sphere swivally mounted on a base in a manner to afford maximum diameter of segment with minimum total vertical height, generous rolling contact area, and protection of bearings against contamination. Preferably means are incorporated to lubricate the bearings and other relatively moving parts in a single application of lubricant. The invention also contemplates a platform assembly in which a plurality of such casters are mounted in inverted position on a supporting structure to provide a transfer and support surface. The type of caster employed enables greater spacing and therefore fewer casters in a given area; and also allows a moving object to approach at a plane below the normal rolling surface and still hit the spherical surface of the segment in such a way as not to catch or be damaged by the edge of the segment.

BACKGROUND OF THE INVENTION

The particular field to which the invention is directed is apparatus for moving flat bottom baggage or freight containers, boxes, or pallets.

In order to provide rolling support, ball bearings have been emloyed. Large balls (about 1" diameter) offer virtually only a point contact, and must be spaced close together. Anything larger is considered to be too heavy and costly. Inverted "creeper" casters (so named because of their wide use on mechanics' creeper carts) have also been used. Although they will function if all conditions are favorable, they exhibit certain inherent defects.

They usually embody a vertical swivel stem rotatably mounted in a tubular socket on a base member, the upwardly extending portion of the stem being angled downwardly and then offset in an angle upwardly to afford a mounting portion for a disc-like roller in the form of a shallow segment of a sphere. By reason of the design (the elevated location of the roller mounting portion) an undesirable dimension occurs between the base member and the most remote surface of the segment. Such dimension has been substantially greater than the diameter of the segment. The segment has been relatively shallow, with its peripheral edge disposed at the uppermost plane of contact between the segment and a surface to be supported.

If the container or pallet happens to confront the open edge of the segment (instead of the oval surface) it may be retarded in movement or at least scuffed before the segment swivels to present the oval surface.

Moreover, some of the bearing surfaces in either ball type or sphere type are exposed to falling dust or other foreign matter; and some of the relatively moving parts are difficult to lubricate.

SUMMARY OF THE INVENTION

A primary object of the invention is to provide an improved caster of rugged construction which is compact in overall height and enables a roller segment to be employed which is relatively large in diameter and deep in cross section.

This is accomplished by utilizing a vertical post fixedly carried on a base, with a swivel socket rotatably mounted on the post. Regarded in the inverted position, as shown in the drawings, this socket extends downwardly with its lower end close to the base.

Preferably formed integral with the swivel socket is a second socket generated at the lower end of the swivel socket and extending upwardly at an angle to the axis of the post.

Rotatably mounted in the second socket is a stem which at its upper end region mounts a roller in the form of a large diameter relatively deep generally spherical segment.

This novel construction provides a caster with an overall vertical dimension which is substantially less than the maximum diameter of the segment, and for load contact on a spherical surface of relatively large radius.

Preferably, the stem has a bore therethrough with a lubrication fitting at the upper end. The bore communicates through its lower end with a transverse bore in the post, which in turn communicates with an axial bore in the post. Thus, lubricant under pressure may be directed to all bearings and relatively rotating parts.

Another important feature is that whether the caster be mounted with the base up or down, all bearings are shielded from contamination by dust or other foreign matter descending vertically in the region of the caster.

The platform assembly is made up of any suitable floor or other caster supporting structure, with my novel casters mounted thereon with their bases down and the rollers up. The ruggedness and low height of the casters combine to require fewer casters in a given area, greater stability to the overall load supporting function, and the deep segments present a rolling surface (instead of a sharp edge) to loads which approach on a plane lower than the plane of the normal rolling surface.

BRIEF DESCRIPTION OF THE DRAWINGS

FIG. 1 is a top plan view of a fragment of a platform with the casters of the invention invertedly mounted thereon to provide a rolling support for containers or pallets.

FIG. 2 is an enlarged top plan view (see the broken line circle 2 in FIG. 1) of one of the casters illustrated in FIG. 1.

FIG. 3 is a vertical section taken on line 3—3 of FIG. 2.

FIG. 4 is a similar view taken on line 4—4 of FIG. 2.

FIG. 5 is a horizontal section taken on the line 5—5 of FIG. 3.

DESCRIPTION OF THE PREFERRED EMBODIMENT

The caster will be described with reference to its environment as shown in the drawings where it is inverted from the conventional position which casters occupy when mounted on legs or bottoms of structures for rolling them over a floor surface.

The caster comprises a base plate 20 formed with apertures 21 for the reception of bolts 22 used to secure the plate upon a platform 23 which may be an independent structure or may rest upon a sub-floor 24. Other mounting means may be substituted.

The base plate preferably incorporates a central vertical offset 25 which forms a recess 26 to accommodate the end flange of the post next to be described.

The vertical post 28 is rigidly secured upon the base plate. It is formed with a reduced neck section 29 which extends through an opening 30 in the base plate. A shoulder 31 seats upon the base plate, and is drawn tight by upsetting the lower end into a rivet-like flange 32. Any other suitable securement means may be employed.

The post rotatably supports a bell shaped socket member 35 which embodies a section 36 having a journal engagement with the post. Lubricant can be introduced between the contiguous surfaces of post and socket. The socket member includes a bell flange section 37.

Mounted in the annular recess afforded by the bell flange section in an outer ball bearing race 40. This cooperates with an inner race 41 to retain balls 42. The inner race is supported on a retaining ring 43 mounted on the base plate.

It is desirable to restrain axial separation of post and socket member by employing a snap ring 45 in a groove 46 in the post, protruding into a groove 47 in the socket member. The snap ring fits loosely enough that it does not obstruct passage of lubricant.

A generally similar but inverted bell shaped socket member 50 extends upwardly at an angle from the bell flange section 37. Preferably it is integral with the latter. By way of example, and not of limitation, the axis of the socket member 50 may be inclined at an angle of about 30° from the axis of the socket member 35.

The socket member 50 rotatably supports a stem 52, being restrained against axial separation by a snap ring 53 located in grooves 54 and 55 similar to the grooves 46 and 47. Bell flange section 56 mounts an outer ball race 58. This cooperates with an inner race 59 to retain balls 60. The inner race is lodged in place by a retaining ring 61.

Rigidily mounted at the upper end of the stem 52 is a roller or disc 65 in the form of a spherical segment, preferably with a flattened center section 66.

This roller presents an external rolling surface 67 suitable for supporting a cargo container or other object such as indicated at 70.

The mounting of the roller may be accomplished by forming the stem with a reduced neck section 71 disposed in an opening 72 in the roller, with an annular shoulder 73 on the stem drawn tight against the inside surface of the roller by a rivet type flange 74. Any other suitable securement means may be employed.

Preferably the roller is made as deep as possible while allowing adequate clearance between its lower edge and the surface on which the base plate is mounted. The curvature and mounting of the roller should be such that the edge of the roller revolves through an upper horizontal plane somewhat below the uppermost plane of the roller's load bearing surface.

This enables a load such as 70 to encounter the rolling surface of the roller even when the load approaches in a plane P below the ultimate support plane SP as shown in broken and full lines, respectively, in FIG. 3.

It may be noted that the arc of support surface offered by the roller is more or less equal to that of a ball twice its diameter, yet the overall height of the caster is less than the diameter of the roller.

The top of the socket 35 and the top of the stem 52 are located in the same general horizontal plane. The roller overlies the bearings in the socket 50. The tangent of the uppermost bearing surface of the roller is generally normal to and intersects a projection of the axis of the post 28 and socket 35. The center of gravity of the load carried is thus disposed in a vertical thrust generally axial of the post. This improves the overall stability of the caster.

Furthermore, in order to provide minimum height, the roller may have its uppermost inner surface in close proximity to the top of the socket 35.

In use, the socket 35 readily swivels on the vertical axis of the post 28 carrying the socket 50 with it, and the inclined stem 52 freely rotates in the latter socket, whereby the roller quickly assumes a rolling support motion when a load encounters it, rotating parallel to the direction of movement of the load.

Another important feature relates to lubrication. Sufficient clearance is provided between adjacent surfaces of all relatively rotating parts for the entrance and passing of a suitable lubricant introduced under the necessary pressure.

The stem 52 is formed with a bore 80 at the upper end region of which is a lubrication fitting 81 recessed in a counterbore 82. The lower end of the bore 80 has communication through a chamber 84, and a passage 86 with a transverse bore 83 in the vertical post 28, which opens into an axial bore 85 in the latter. The latter opens into a chamber 87. When lubricant is introduced under pressure through the fitting 81 it moves through the bores in both the stem and post, travelling between the surfaces of the post 28 and the bell socket 35 to the ball bearings 42, and also between the surfaces of the stem 52 and the bell socket 50 to the ball bearings 60. Thus, all relatively moving parts of the caster are lubricated in a single application.

Furthermore, it will be seen that the entire construction is such that all relatively moving surfaces are protected against contamination by falling dust or other descending foreign matter.

In utilizing the casters in a platform assembly, as illustrated in FIG. 1, they may be bolted to a platform or any other suitable support structure in any desired pattern, one example being illustrated therein. Spacing between the casters will depend in part upon the weight bearing capacity of each caster in relation to the anticipated load weight for a given area. However, the casters of the present invention are very rugged and offer greater individual load bearing capacity than any prior art caster of similar size of which I am aware. Consequently, the spacing may be greater than heretofore employed. The casters should be uniform in height, so that their uppermost rolling surfaces lie in a generally single horizontal plane. Each must be sufficiently close to another in respect to the area of the load that the latter will not fall down between them.

Although I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices and apparatus.

What I claim is:

1. A caster comprising a base, a generally vertical post fixedly mounted at its lower end region on the base, a first hollow socket member embodying an upper section journalled on the post and a lower section of larger internal diameter than that of the upper section, bearing means in the lower section sustaining downward axial thrust load imposed upon the socket member, an inverted second hollow socket member rigidly affixed to the first socket member with its axis inclined to the axis of the first socket member, the second socket member having a lower section and an upper section of larger internal diameter than that of the lower section, a stem journalled in the lower section of the second socket member, bearing means in the upper section of the second socket member sustaining downward axial thrust load imposed upon the stem, and a rolling member in the form of a generally spherical segment fixedly mounted on the stem.

2. A caster as defined in claim 1 in which both socket members are generally bell shaped, the flare of the bell forming the sections of relatively larger internal diameter whereby annular recesses are provided externally of the post and stem respectively, and the respective bearing means are disposed in these annular recesses.

3. A caster as defined in claim 1 in which the stem includes a first axial bore, means in the upper end of the bore for reception of lubricant, a first transverse lubricant passage communicating with the bore to conduct a lubricant therefrom to the exterior of the post, a second transverse passage in the post to receive such conducted lubricant, a second axial bore in the post closed at the bottom communicating with the second transverse passage therein to conduct lubricant therefrom through the upper end of the post, a third transverse lubricant passage communicating with the upper end of the bore in the post to conduct lubricant therefrom to the upper section of the first socket.

References Cited

UNITED STATES PATENTS

| | | | |
|---|---|---|---|
| 2,294,807 | 9/1942 | Schultz, Jr. | 16—43X |
| 2,631,328 | 3/1953 | Kramcsak, Jr. | 16—18(A) |
| 2,759,585 | 8/1956 | Timmons et al. | 193—37X |
| 2,787,804 | 4/1957 | Noelting et al. | 16—36X |
| 2,810,151 | 10/1957 | Lapham | 16—18(A) |
| 2,847,696 | 8/1958 | Kramcsak, Jr. | 16—18(A)X |
| 3,296,650 | 1/1967 | Eurey et al. | 16—45X |

DAVID J. WILLIAMOWSKY, Primary Examiner

P. C. KANNAN, Assistant Examiner

U.S. Cl. X.R.

16—46